United States Patent [19]
Jones et al.

[11] Patent Number: 5,167,519
[45] Date of Patent: Dec. 1, 1992

[54] TEMPERATURE COMPENSATING UNIVERSAL CONNECTOR

[75] Inventors: Arthur B. Jones; David R. Peterson, both of Rochester, N.Y.

[73] Assignee: Transmation, Inc., Rochester, N.Y.

[21] Appl. No.: 789,968

[22] Filed: Nov. 12, 1991

[51] Int. Cl.[5] ............................................. H01R 13/15
[52] U.S. Cl. .................................... 439/259; 439/913; 374/181; 374/208; 136/235
[58] Field of Search ............... 374/179, 181, 208, 141, 374/152; 136/230, 235; 439/259, 263, 620, 727, 781, 711, 791, 794, 913

[56] References Cited

U.S. PATENT DOCUMENTS

| | | | |
|---|---|---|---|
| 3,584,510 | 6/1971 | Harris | 136/235 X |
| 3,725,847 | 4/1973 | Guneratne | 439/913 X |
| 4,776,706 | 10/1988 | Loiterman et al. | 374/208 |

*Primary Examiner*—Larry I. Schwartz
*Assistant Examiner*—Khiem Nguyen
*Attorney, Agent, or Firm*—Jay M. Cantor

[57] ABSTRACT

A universal connector including a housing of molded thermoplastic having a pair of slots in a side thereof for receiving therein plugs or wires of various shapes and sizes for connection with the connector and a slot for receiving therethrough a stud. A pair of copper blocks are positioned adjacent each other with a pair of beryllia washers and a temperature sensor therebetween. One block includes a pair of plain apertures extending entirely through the block. The other block includes a pair of threaded apertures extending entirely through that block. These apertures are aligned with the washers. The blocks also include opposing grooves which, together, form an aperture. A pair of nylon screws are threaded into the threaded apertures to secure the blocks into tight frictional engagement against the washers and the temperature sensor. A copper wire is secured to the block and a copper wire is secured to the block to provide electrical connection between the blocks and an external device. A knob with an electically insulated threaded stud extends through a thrust washer disposed over the aperture and through the aperture and is threaded into a threaded portion of a clamp. The clamp rests against the blocks and any plug pins or bare wires disposed between the clamp and the blocks to make connection between the plug pins or bare wires and the blocks. The clamp, blocks and plug pins or bare wires are placed in compressive engagement with each other by rotation of the stud in the threaded portion, thereby pulling the clamp toward the washer.

15 Claims, 1 Drawing Sheet

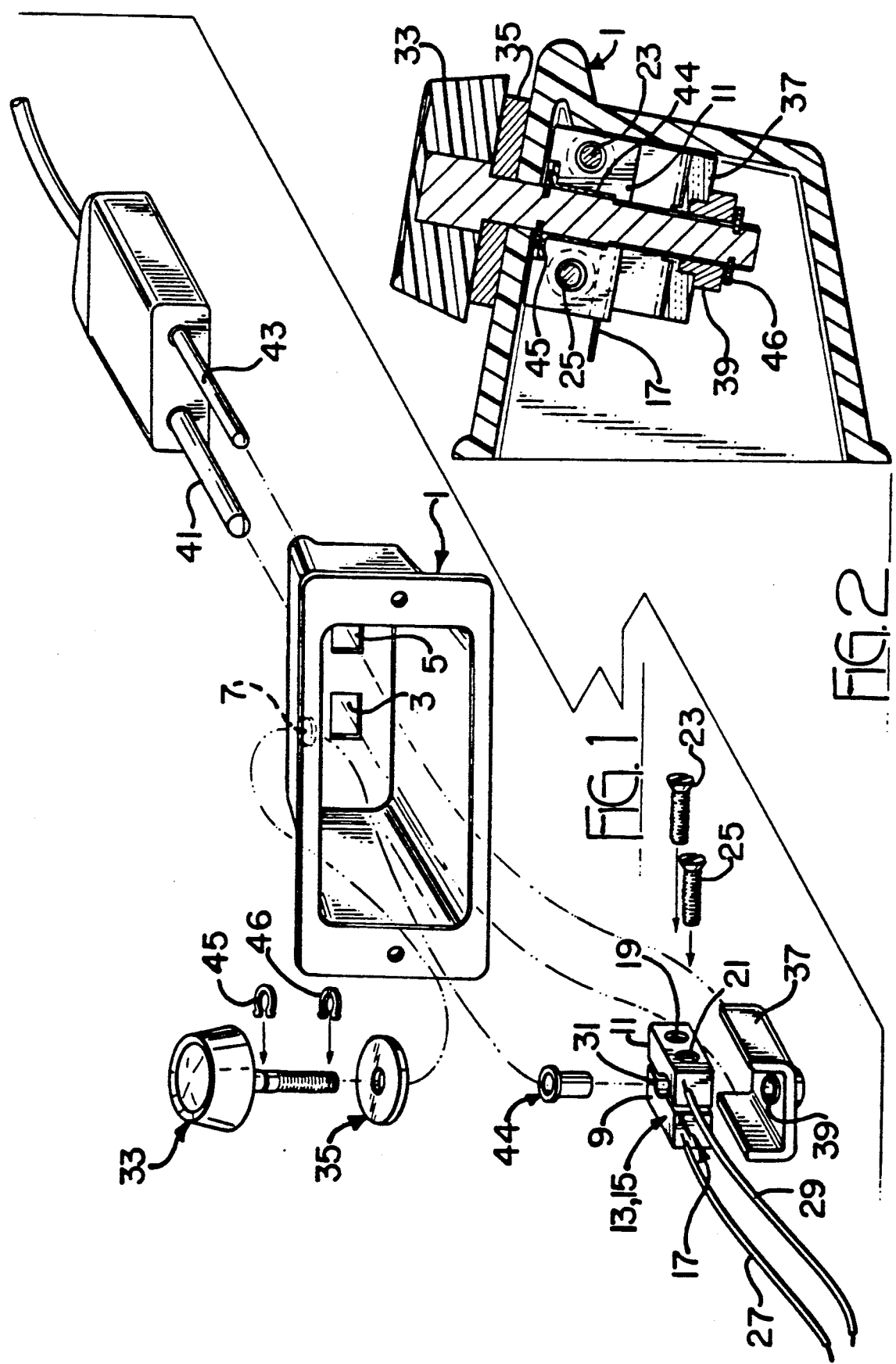

TEMPERATURE COMPENSATING UNIVERSAL CONNECTOR

BACKGROUND OF THE INVENTION

1. Field of the Invention

This invention relates to a universal connector and, more specifically, to a universal connector capable of temperature compensation.

2. Background and Brief Description of the Prior Art

Temperature compensating universal connectors have been known in the prior art and find use in many areas, such as, for example, in thermocouple and millivolt calibrators. In such thermocouple and millivolt calibrators, which are used to calibrate thermocouple input temperature indicating or transmitting instruments or which are to be connected to a thermocouple to measure and display the temperature of the thermocouple hot junction in degrees Fahrenheit or Celsius, the instrument is either the source for or the receiver of thermocouple based signals, the magnitudes of which are in the millivolt range. To be useful, the generated or received thermocouple based signals must be cold junction compensated before they can be interpreted into or out of temperature values.

The above noted instruments are capable of being connected to one of three different types of thermocouple wire sets or copper wires for the millivolt applications, one at a time. This is made possible by constructing the input/output connector of copper and sensing the temperature of the connector copper such that an appropriate compensation may be computed for the appropriate thermocouple half-junctions which exist when thermocouple wires are mated to the copper parts of the connector. Direct half-junction compensation has been used in the prior art.

Thermocouple wires come in different gages or diameters. Frequently, thermocouple wires are terminated in a variety of thermocouple material connectors. These connectors come with pins of various diameters, flat blades and different pin or blade spacings.

The problem of thermocouple compensation is well known in the art. Two criteria are of importance. First, the degree of compensation for the type of thermocouple wire in use over a range of steady ambient temperature typical of the use of the instrument and, second, compensation for dynamic temperature changes. The first criterion is of importance to all instruments. However, the second criterion is of particular importance in the case of portable instruments. Here it is necessary to expect that the instrument will be moved from hot to cold regions and vice-versa with availability for measuring or calibrating being expected by the user more or less on an immediate basis. The problem, as a practical matter, arises when the instrument is transported to a job site at a temperature substantially different from that encountered at the job site and is immediately placed into use on thermocouple wires or connectors which are of a quite different temperature. In making the transition from one to another temperature environment, the instrument, additionally, may be subject to an internal temperature gradient. Different parts of the same instrument, for external or internal reasons, may make the temperature transition at different rates. Similarly, the two metallic components of the connector or thermocouple wires will not necessarily be at the same temperature. These effects, combined in various scenarios, have produced errors in the past of several degrees Fahrenheit with a duration of many minutes. Until the transient effects are dissipated, an accurate measurement can not be made and the user is forced to linger for the duration of the transient.

In the prior art, Schmitz (U.S. Pat. No. 4,804,272) teaches a procedure for sensing the temperature of a termination by using a thermal bridge (block) between the critical position on the terminal block and the thermal sensor, the sensor being buried for effectiveness in the thermal bridge. There is no provision for permitting two different electrical circuits to benefit from the single sensor or to capture wires or connector pins of different sizes.

The patent to Muller (U.S. Pat. No. 2,410,098) emphasizes providing a gas tight connection through a bulkhead which can be disengaged from either side. The need for thermal compensation is avoided by making mating parts of matching alloys. Neither the issue of sensing the connection temperature nor the issue of capturing wires or pins of different sizes is raised.

The patent to Loiterman (U.S. Pat. No. 4,776,706) relates to a connector and compensating terminal apparatus for use with temperature responsive instruments to accommodate sensing devices such as thermocouples and resistance temperature devices (RTDs) having a wide plurality of lead connectors. The apparatus includes a temperature compensating block assembly having first and second conductive blocks coupled together at opposing surfaces by means of a thermally conductive and electrically insulative material, a corresponding surface of each block being adapted to receive one lead of a thermocouple sensor or RTD, which lead is held in contact on the surface of the block by a holding block having a corrugated holding surface and which holding block is movably mounted with respect to the conductive block to provide a variable spacing to enable the apparatus to accommodate the different types of thermocouple or RTD lead connectors. Additionally, there are two outside conducting blocks for two of the 3 or 4 RTD leads, which leads are also held in place by the respective holding blocks. This patent requires two holding block and two screws for operation thereof to accommodate the different wire or connector pin sizes and requires pushing of wires or pins into the blocks. The pushing requires that the instrument housing and circuit board must be structurally strong enough to tolerate the pushing action. Also, Loiterman maximizes the thermal mass of the copper blocks.

SUMMARY OF THE INVENTION

In accordance with the present invention, the problems inherent in the above noted prior art is minimized and there is provided a temperature compensated universal connector having a single clamp and screw in place of the two holding blocks of the prior art to provide sufficient flexibility to capture different size wires or different size connector pins securely between itself and respective right and left copper blocks by using the clamp to pull the thermocouple wires or connector pins against the blocks rather than pushing the wires or connector pins into the blocks. The pulling action confines the forces to between a clamp, a screw, captive copper blocks and the captured wires or pins. The copper mass is minimized by drilling holes for the nylon screws and the thermal sensor is located between and against the copper blocks to optimize the transient thermal performance of the assembly. Accordingly, the present invention provides the capability of accepting a variety of thermocouple male pin connectors or bare thermocouple wires of various thicknesses or gages as well as providing superior transient temperature performance. The construction reduces the transient error to less than 0.2° C. for temperature changes of 50° C. or less applied in any fashion. The duration of the transient is no longer of concern because the transient error is of the order of magnitude of the accuracy of the instrument. By way of example, the instrument can be used immediately after being stored in a hot car when connected to wires in an air conditioned environment.

Briefly, the connector in accordance with the present invention includes a housing of electrically insulating material, preferably a molded thermoplastic material such as a polycarbonate and preferably LEXAN 141 Black produced by General Electric Company, of standard type having slots to admit various sizes and shapes of plugs or wires therein. The connector itself is disposed within the housing and includes two copper blocks separated by two beryllia (BeO) washers and held together by two nylon screws. While beryllia is preferred, other strong plastics could be used. The desired properties sought are high tensile strength and good electrical insulation. Beryllia is preferred because it is an excellent thermal conductor and a good electrical insulator, these properties being crucial to excellent connector performance. Embedded in and attached to one of the copper blocks, in a thermally intimate but electrically isolated manner, is a temperature sensor. The copper blocks have a circular notch which forms a clearance hole, once assembled, for a threaded stud. That stud, passing through the housing and the clearance hole of the blocks, engages a threaded insert in the clamp, which clamp is positioned to permit the capture of wires or of connector pins between itself and the copper blocks. By this method, the wires or connector pins are brought into close thermal and electrical contact with the copper blocks. A copper wire is attached to a small hole in each of the two blocks to permit the electrical signal to be conducted to the internal circuits of the instrument. Similarly, the wires from the temperature sensor, preferably embedded in one of the blocks, are made available to the circuitry of the instrument.

A thrust washer between the knob and the housing serves to distribute the load on the shoulder of the knob to a larger area of the plastic housing. It has no thermal significance.

The connector design of the connector of the present invention merges outstanding thermal behavior to universality of connection format.

BRIEF DESCRIPTION OF THE DRAWINGS

FIG. 1 is an exploded View of a universal connector in accordance with the present invention; and FIG. 2 is a cross sectional view of the assembled connector of FIG. 1.

DESCRIPTION OF THE PREFERRED EMBODIMENT

Referring now to FIGS. 1 and 2, there is shown a preferred embodiment of a universal connector in accordance with the present invention. The connector includes a housing 1 formed of standard molded thermoplastic polycarbonate material having a pair of slots 3 and 5 in a side thereof for receiving therein plugs or wires of various shapes and sizes for connection with the connector and a slot 7 for receiving therethrough a stud 33 as will be explained hereinbelow.

A pair of copper blocks 9 and 11 are positioned adjacent each other with a pair of beryllia washers 13 and 15 and a temperature sensor 17 therebetween. The copper blocks 9 and 11 include a pair of apertures 19 and 21 extending entirely through the blocks. The apertures through block 9 are threaded and the apertures through block 11 are unthreaded. The blocks 9 and their apertures are aligned with the washers 13 and 15. The copper blocks 9 and also each include an opposing groove which grooves, together, form an aperture 31 extending entirely through the blocks. An electrically insulating sleeve 44 is disposed in aperture 31 between blocks 9 and 11. A pair of nylon screws 23 and 25 extending through the apertures of block 11 are threaded into the threaded apertures of block 9 to secure the blocks 9 and 11 into tight compressional engagement against the washers 13 and 15 and the temperature sensor 17. A copper wire 27 is secured to the block 9 and a copper wire 29 is secured to the block 11 to provide electrical connection between the copper blocks and an external device, such as, for example, an amplifier.

A knob with a threaded stud 33 extends through slot 7 and a thrust washer 35 disposed over the aperture 31 and also extends through the aperture 31 to a clamp 37 and is threaded into a threaded portion 39 of the polycarbonate clamp. A pair of retaining rings 45, 46 are disposed over the washer 35 and around the stud 33 and below slot 7. Retaining ring 45 retains the connector within the housing 1 and retaining ring 46 prevents the clamp 37 from being opened needlessly far and possibly becoming disengaged from stud 33. Any insulator which is strong, flexible and not given to cracking or premature aging can be used in place of the polycarbonate. The insulating sleeve 44 insulates the metallic stud 33 from blocks 9 and 11 and prevents the stud from touching either or both blocks to avoid the possibility of causing a short circuit therebetween. The clamp 37 rests against the undersurface blocks 9 and 11 and any plug pins or bare wires 39 disposed between the clamp and the blocks to make connection between the plug pins or bare wires and the blocks. The clamp 37, blocks 9 and 11 and plug pins or bare wires 41 and 43 are placed in compressive engagement with each other by rotation of the stud 33 in the threaded portion 39, thereby pulling the clamp 39 toward the washer 35.

It can be seen that there has been provided a temperature compensating universal connector having a single clamp and screw in place of the two holding blocks of the prior art to provide sufficient flexibility to capture different size wires or different size connector pins securely between the clamp and respective right and left copper blocks by using the clamp to pull the thermocouple wires or connector pins against the blocks rather than pushing the wires or connector pins into the blocks. The pulling action confines the forces to the region between the clamp, the screw, the captive copper blocks and the captured wires. The copper mass is minimized by drilling holes for the nylon screws and the thermal sensor is located to optimize the transient thermal performance of the assembly. Accordingly, the present invention provides the capability of accepting a variety of thermocouple male pin connectors or bare thermocouple wires of various thicknesses or gages as well as providing superior transient temperature performance.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

We claim:

1. A temperature compensating universal connector, which comprises:
    (a) a temperature compensating block assembly comprising first and second spaced apart electrically conductive blocks;
    (b) a highly thermally conductive and electrically insulative member disposed between and contacting said blocks;
    (c) an electrically insulating clamp disposed adjacent each of said blocks;
    (d) an electrically insulated device extending through said blocks and secured to said clamp to move said clamp in compressive engagement toward said blocks;
    (e) an aperture extending through one of said blocks;
    (f) an aperture extending through the other of said blocks; and
    (g) an electrically insulating member secured in said aperture to move said blocks in compressive engagement with said highly thermally conductive and electrically insulative member.

2. A temperature compensating universal connector, which comprises:
    (a) a temperature compensating block assembly comprising first and second spaced apart electrically conductive blocks;
    (b) a highly thermally conductive and electrically insulative member disposed between said blocks and contacting said blocks;
    (c) an electrically insulating clamp disposed adjacent each of said blocks;
    (d) electrically insulated means extending through said blocks and secured to said clamp to move said clamp in compressive engagement toward said blocks;
    (e) an aperture extending through one of said blocks;
    (f) a threaded aperture extending through the other of said blocks; and
    (g) an electrically insulating threaded member secured in said threaded aperture to move said blocks in compressive engagement with said highly thermally conductive and electrically insulative member.

3. A connector as set forth in claim 2 wherein said highly thermally conductive and electrically insulative member is a washer aligned with said threaded and unthreaded apertures.

4. A connector as set forth in claim 1 further including an aperture defined by said blocks and extending between said blocks, said means extending through said blocks extending therethrough through said aperture.

5. A connector as set forth in claim 2 further including an aperture defined by said blocks and extending between said blocks, said means extending through said blocks extending therethrough through said aperture.

6. A connector as set forth in claim 3 further including an aperture defined by said blocks and extending between said blocks, said means extending through said blocks extending therethrough through said aperture.

7. A connector as set forth in claim 1 wherein said conductive blocks are copper, said highly thermally conductive and electrically insulative member is beryllia and said clamp is polycarbonate.

8. A connector as set forth in claim 6 wherein said conductive blocks are copper, said highly thermally conductive and electrically insulative member is beryllia and said clamp is polycarbonate.

9. A connector as set forth in claim 8 wherein said electrically insulating threaded member is nylon.

10. A connector as set forth in claim 2 wherein said threaded and unthreaded apertures extend in a direction normal to the direction of said electrically insulated means extending through said blocks and secured to said clamp.

11. A connector as set forth in claim 3 wherein said threaded and unthreaded apertures extend in a direction normal to the direction of said electrically insulated means extending through said blocks and secured to said clamp.

12. A connector as set forth in claim 5 wherein said threaded and unthreaded apertures extend in a direction normal to the direction of said electrically insulated means extending through said blocks and secured to said clamp.

13. A connector as set forth in claim 6 wherein said threaded and unthreaded apertures extend in a direction normal to the direction of said electrically insulated means extending through said blocks and secured to said clamp.

14. A connector as set forth in claim 8 wherein said threaded and unthreaded apertures extend in a direction normal to the direction of said electrically insulated means extending through said blocks and secured to said clamp.

15. A connector as set forth in claim 9 wherein said threaded and unthreaded apertures extend in a direction normal to the direction of said electrically insulated means extending through said blocks and secured to said clamp.

* * * * *